United States Patent
Krishnan et al.

(10) Patent No.: US 8,199,717 B2
(45) Date of Patent: Jun. 12, 2012

(54) METHOD FOR PERMITTING VERTICAL HANDOFF OF A MOBILE NODE IN A COMMUNICATION SYSTEM

(75) Inventors: Suresh Krishnan, Montreal (CA); Wassim Michel Haddad, West New York, NJ (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 876 days.

(21) Appl. No.: 12/201,882

(22) Filed: Aug. 29, 2008

(65) Prior Publication Data

US 2008/0316974 A1 Dec. 25, 2008

Related U.S. Application Data

(63) Continuation-in-part of application No. 11/963,289, filed on Dec. 21, 2007, now abandoned.

(60) Provisional application No. 60/986,622, filed on Nov. 9, 2007.

Foreign Application Priority Data

Feb. 9, 2007 (WO) .................. PCT/EP2007/051279

(51) Int. Cl.
*H04W 4/00* (2009.01)
(52) U.S. Cl. ........ 370/331; 370/328; 370/332; 370/333; 370/330; 370/329; 455/436; 455/439; 455/442
(58) Field of Classification Search .................. 370/331, 370/332, 329, 330, 333; 455/436, 439, 442, 455/33.2
See application file for complete search history.

(56) References Cited

U.S. PATENT DOCUMENTS

| | | | |
|---|---|---|---|
| 2004/0013116 A1 | 1/2004 | Greis et al. | |
| 2005/0147122 A1 | 7/2005 | Florimond Van Acker et al. | |
| 2007/0091822 A1 | 4/2007 | Do et al. | |
| 2007/0147292 A1 | 6/2007 | Van Ewijk et al. | |
| 2007/0268919 A1* | 11/2007 | Sarikaya et al. | 370/401 |
| 2009/0268661 A1* | 10/2009 | Ng et al. | 370/328 |

OTHER PUBLICATIONS

S. Gundavelli et al., Proxy Mobile IPv6, Internet Draft, NETLMM WG, Jun. 18, 2007.
S. Gundavelli et al., Proxy Mobile IPv6, Internet Draft, NETLMM WG, Nov. 4, 2007.
D. Johnson et al., Mobility Support in IPv6, Network Working Group, RFC 3775, Jun. 2004.
S. Gundavelli et al., Proxy Mobile IPv6, Internet Draft, NETLMM WG, Sep. 23, 2007.
S. Gundavelli et al., Proxy Mobile IPv6, NETLMM WG, Internet Draft, Apr. 8, 2007, pp. 1-46.
J. Arkko et al., Selection of MIPv6 Security Level Using a Hashed Address, Network Working Group, Internet Draft, Jun. 24, 2002, pp. 1-8.
W. Haddad et al., IP Tunneling Optimization in a Mobile Environment, Mobility for IPv6 (MIP6) WG, Internet Draft, Jul. 9, 2007, pp. 1-18.
B. Pentland, An Overview of Approaches to Detecting Network Attachment in IPv6, DNA Working Group, Internet Draft, Feb. 14, 2005, pp. 1-24. J. Zhang et al., TRDP: A Trusted Router Discovery Protocol, 2007 International Symposium on Communications and Information Technologies (ISCIT 2007), 2007 IEEE, pp. 660-665.
International Search Report from corresponding PCT Application No. PCT/IB2008/054548.

* cited by examiner

*Primary Examiner* — Jeffrey Pwu
*Assistant Examiner* — Abdelnabi Musa

(57) ABSTRACT

Methods, Mobile Node and Mobility Access gateway for enabling vertical handoff of the Mobile Node between a first and second network interfaces using a pad translator.

22 Claims, 7 Drawing Sheets

METHOD FOR PERMITTING VERTICAL HANDOFF OF A MOBILE NODE IN A COMMUNICATION SYSTEM

PRIORITY STATEMENT UNDER 35 U.S.C S. 119 & 37 C.F.R. S.1.78

This non-provisional patent application claims priority based upon the prior U.S. provisional patent application entitled "PMIPv6 PRIVACY ENHANCEMENT", application Ser. No. 60/986,622, filed Nov. 9, 2007, in the names of Suresh Krishnan and Wassim Haddad. This non-provisional patent application is also a Continuation In Part (CIP) of U.S. application Ser. No. 11/963,289, filed Dec. 21, 2007 now abandoned, entitled "ENHANCING PROTECTION OF A MOBILE NODE'S HOME ADDRESS IN A VISITED NETWORK", in the name of Suresh Krishnan and Wassim Haddad.

TECHNICAL FIELD

The present invention relates to Proxy Mobile IPv6 and, more precisely, to enhancing privacy in Proxy Mobile IPv6.

BACKGROUND

Proxy Mobile Internet Protocol version 6 (IPv6) protocol (described in draft-ietf-net1mm-proxymip6-06.txt herein included by reference) is an ongoing activity, which aims essentially to provide network based mobility. The main concept is to trick the mobile node (MN) into believing that it is always attached to its home network even when in reality, it has switched to foreign network(s). Consequently, the MN can keep using its IP home address (HoA) while being located away from its home network.

Being a network-based mobility mechanism, PMIPv6 achieves its goal by enabling the MN to retain its HoA when attaching to a foreign network and delegates the task of securely discovering and updating the MN's Local Mobility Anchor (LMA) to a Mobile Anchor Gateway (MAG). The LMA is the home agent for the mobile node in the Proxy Mobile IPv6 domain. It is the topological anchor point for the mobile node's home network prefix and is the entity that manages the mobile node's reachability state. It is important to understand that the LMA has the functional capabilities of a home agent as defined in Mobile IPv6 base specification (RFC-3775 herein included by reference) and with the additional capabilities required for supporting Proxy Mobile IPv6 protocol.

The MAG fulfills its task by sending a proxy binding update (PBU) message to the LMA thereby requesting a binding of the MN's home network prefix (HNP) to the MAG's egress interface address. The MN's care-of address (CoA) is therefore defined as the MAG's egress interface address. Following a successful binding update, the MN's LMA starts tunneling data packets sent from correspondent node(s) (CN) (i.e., which is kept totally unaware about the MN's mobility) to the MN's CoA, i.e., MAG's egress interface address. The MAG then decapsulates each data packet sent to the MN's CoA and forwards it to the MN. It follows, as mentioned earlier, that the MN will always believe that it is still attached to its home network. The MAG, in that regard, takes great care of nurturing the MN's belief by advertising in unicast mode its home prefix in order to convince it to (re)-configure its HoA.

Unfortunately, the current situation poses at least one problem as a malicious node can learn/detect the MN's HoA or HNP. The HoA/HNP can eventually be used by the malicious node for various wrongdoings. While this is a problem as such, it becomes a more concrete issue as some jurisdictions are considering rules and legislations to diminish its likelihood. An MN's privacy is therefore potentially compromised while switching to and moving across foreign networks. As such, there is a need for a solution that helps preventing HoA and/or HNP disclosure n the context, for instance, of PMIPv6. The present invention provides such a solution.

SUMMARY

A first aspect of the present invention is directed to a method for permitting vertical handoff of a Mobile Node (MN) between a first interface of the MN bearing an address A@ to which a prefix pfA is associated and a second interface of the MN used to connect towards a Mobility Access Gateway (MAG). The method comprises a step of, in the MAG, generating a network prefix pfB' in relation to the prefix pfA. The pfB' is usable to generate an address B@ for the MN. The method comprises further steps of generating a Pad translator (PaT) used to change between the address B@ and the address A@ and sending from the MAG the pfB' towards the MN over the MN's second interface.

Optionally, the method may further comprise the step of, after generating the network prefix pfB', generating the address B@ at the MAG.

The method may also comprise performing a Duplication Address Detection (DAD) procedure on at least a portion of the address B@. If the procedure is not successful, it is possible to regenerating the network prefix pfB' and/or the address B@ at the MAG.

The method may also further comprise receiving at the MAG data packets addressed to the address A@ and forwarding the data packets to the MN toward the second interface by applying the generated PaT thereby addressing the data packets to the address B@.

A second aspect of the present invention is directed to a method for permitting vertical handoff of a Mobile Node (MN) between a first interface of the MN bearing an address A@ to which a prefix pfA is associated and a second interface of the MN bearing the address A@ and used to connect towards a Mobility Access Gateway (MAG). The method comprises the steps of, in the MN, receiving a network prefix pfB' from the MAG over the second interface, generating an address B@ for the MN and generating a Pad Translator (PaT) used to change between the address B@ and the address A@.

Optionally, the method may further comprise the steps of receiving data packets from the MAG over the second interface and applying the generated PaT on the data packets received from the MAG thereby replacing the address B@ in the received data packets for the address A@. In such a case, the method may further comprise a step of delivering the received data packets in the MN to the address A@.

The method may also further comprise a step of applying the PaT in the MN on outgoing data packets sent to the MAG thereby replacing the address A@ for the B@ therein.

A third aspect of the present invention is directed to a Mobile Node (MN) having a first interface bearing an address A@ to which a prefix pfA is associated and a second interface bearing the address A@ and used to connect towards a Mobility Access Gateway (MAG). The MN comprises a Pad Translator Generator module and a Pad Translator Applicator module. The Pad Translator Generator module receives a network prefix pfB' from the MAG over the second interface, generates an address B@ and generates a Pad Translator (PaT) used to change between the address B@ and the address A@. The Pad Translator Applicator module applies the PaT on data packets.

Optionally, the Pad Translator Applicator module may apply the PaT on the data packets before sending the data packets to the MAG and/or on the data packets after receiving the data packets from the MAG.

The Pad Translator Applicator module may also deliver the received data packets in the MN to the address A@.

A fourth aspect of the present invention is directed to a Mobile Access Gateway (MAG). A Mobile Node (MN) has a first interface of bearing an address A@ to which a prefix pfA is associated and a second interface used by the MN to connect towards the MAG. The MAG comprises a Pad Translator Generator module and a Pad Translator Applicator module. The Pad Translator Generator module generates a network prefix in relation to the prefix pfA, generates a network prefix pfB' usable to generate an address B@ for the MN, generates a Pad translator (PaT) used to change between the address B@ and the address A@ and sends the network prefix pfB' towards the second interface of the MN. The Pad Translator Applicator module applies the PaT on data packets.

The Pad Translator Applicator module may also apply the PaT on the data packet before sending the data packets to the MN and/or on the data packet after receiving the data packet from the MN.

The Pad Translator Generator module, after generating the network prefix ptB', may further generate the address B@ and may also further perform a Duplication Address Detection (DAD) procedure on at least a portion of the address B@. If the procedure is not successful, it may further regenerate the network prefix pfB' and/or the address B@.

BRIEF DESCRIPTION OF THE DRAWINGS

A more complete understanding of the present invention may be gained by reference to the following 'Detailed description' when taken in conjunction with the accompanying drawings wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
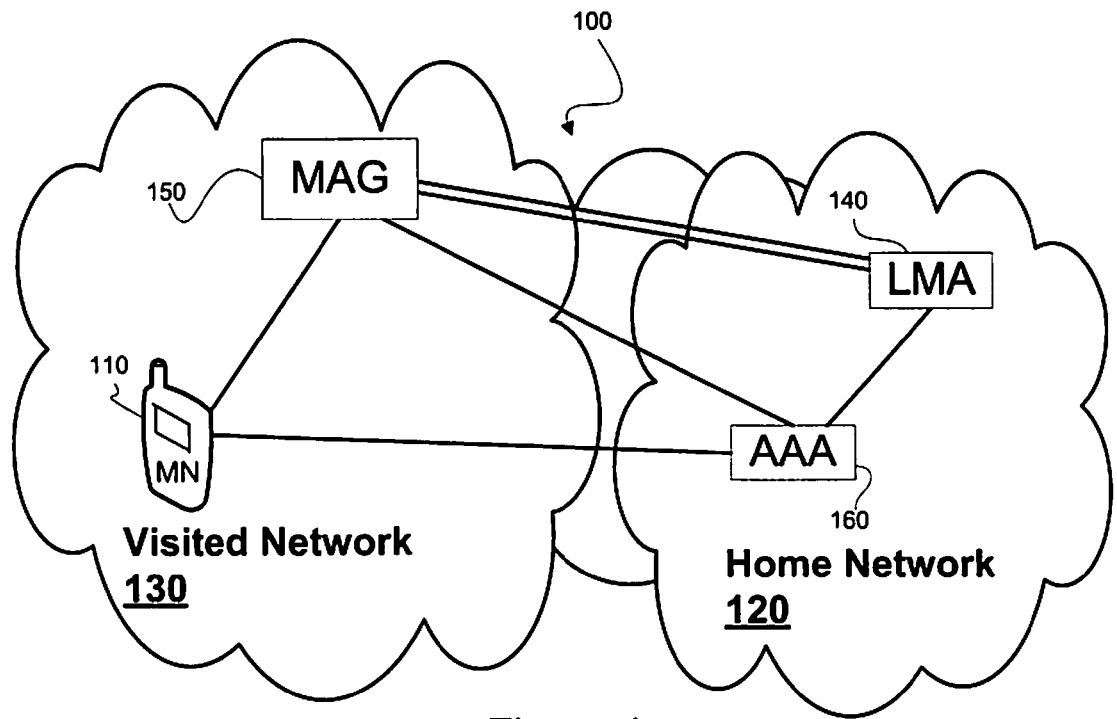
FIG. 1 is a topological view of a telecommunications network in accordance with the teachings of the present invention.

Reference is now made to the drawings, in which FIG. 1 shows a topological view of a telecommunications network 100 in accordance with the teachings of the present invention. The present invention enables enhanced protection of information permitting identification of a user node. While it is applicable to a fixed terminal node or a mobile terminal in its home network, the present invention is of great pertinence in a mobility context with a Mobile Node (MN) 110 roaming from a home network 120 to a visited network 130. The invention will thus be described in the mobile context with the MN 110 as the user node that needs enhanced protection of its identification information. It should be readily understood that a wide variety of network topologies and configurations support the invention, the example of FIG. 1 being chosen to illustrate the invention in a clear and simple manner.

The MN 110 has a home address (HoA) valid in the home network 120. The home network 120 comprises an anchor point 140 of the MN 110 (referred to hereinafter as a Local Mobility Anchor (LMA) 140). The MN 110 retains its HoA while roaming in the visited network 130. The visited network 130 comprises a local anchor point (hereinafter referred to as a Mobility Anchor Gateway (MAG) 150) that provides connectivity capability to the MN 110. The enhanced protection is achieved, for instance in the MAG 150 but also potentially from other nodes, by removing or replacing the HoA (or at least its interface identifier (IID)) from packet that would otherwise need to mention it. The removal or replacement of the HoA (or its IID) is done in a predetermined way that makes it possible to obtain what would otherwise have been sent, but only in those nodes having previous knowledge of the HoA (or its IID). It is also possible while it would not be optimal, to apply the same concept to only a portion of the IID or other portions of the HoA. In such a case, only the replaced or removed portion would thereby be protected.

In the optimal implementation, the MAG 150 communicates with the MN 110 using a first set of protection values and communicates with the LMA 140 using a second set of protection values. Furthermore, it could be decided that, for instance, the risks present on only one of the segments justify using the protection scheme.

Additionally, the present invention suggests an optional improvement of protection value generation that avoids disclosure of a public key of the MN 110 by using an Authentication, Authorization, Accounting node (AAA) 160 (this is of particular interest in the context of cryptographically generated home address). Of course, it can be readily understood that other nodes than the AAA 160 could serve in the context of the present invention as long as a trust relationship exists with the MN 110. Finally, a further optional improvement of the protection value generation avoids problems related to duplication of address detection in the visited network 130.

Figure 2A:
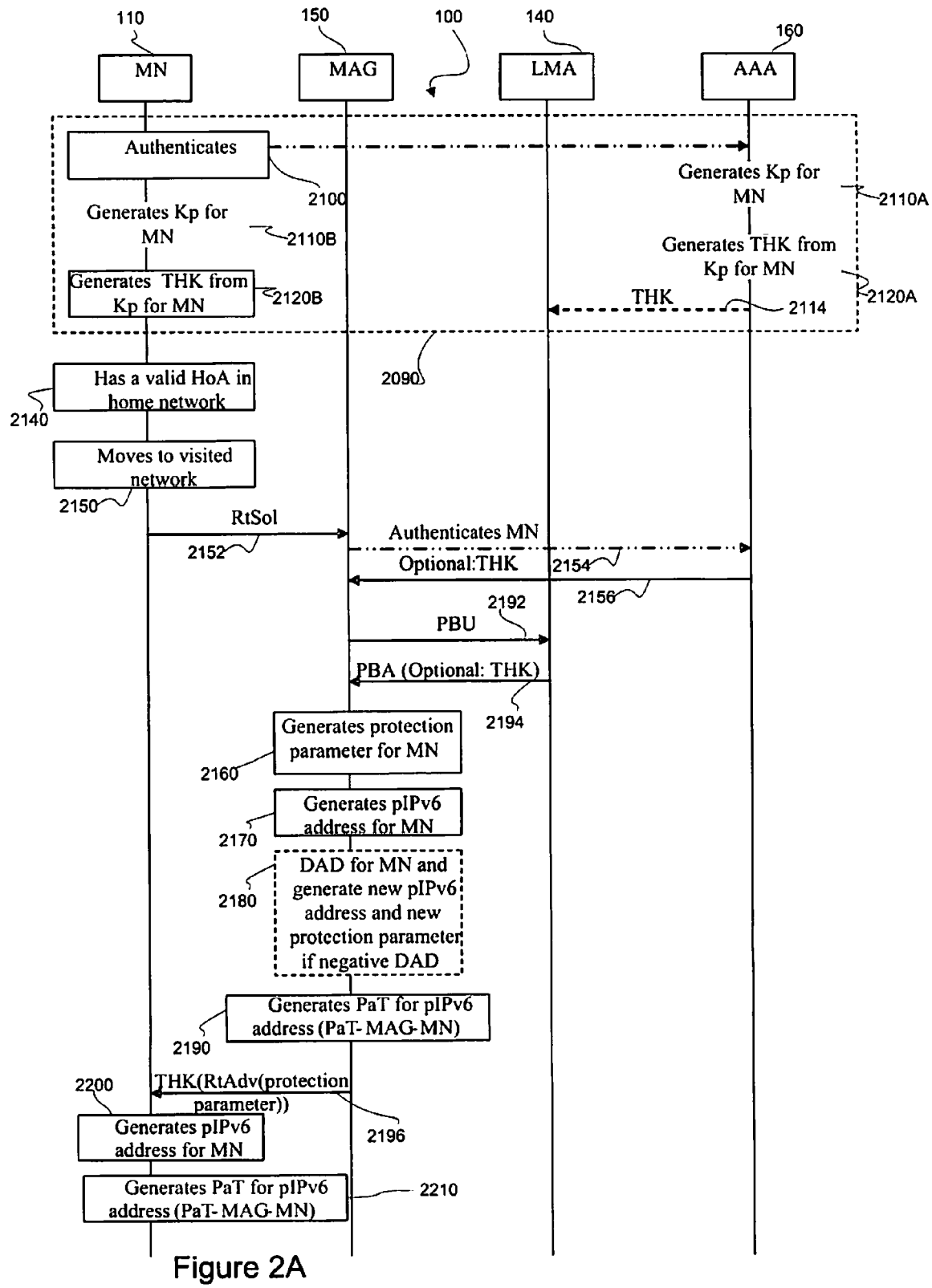
FIG. 2A and FIG. 2B together referred to as FIG. 2 is an exemplary signal flow and nodal operation chart of the protection scheme in accordance with the teachings of the present invention.
Figure 2B:
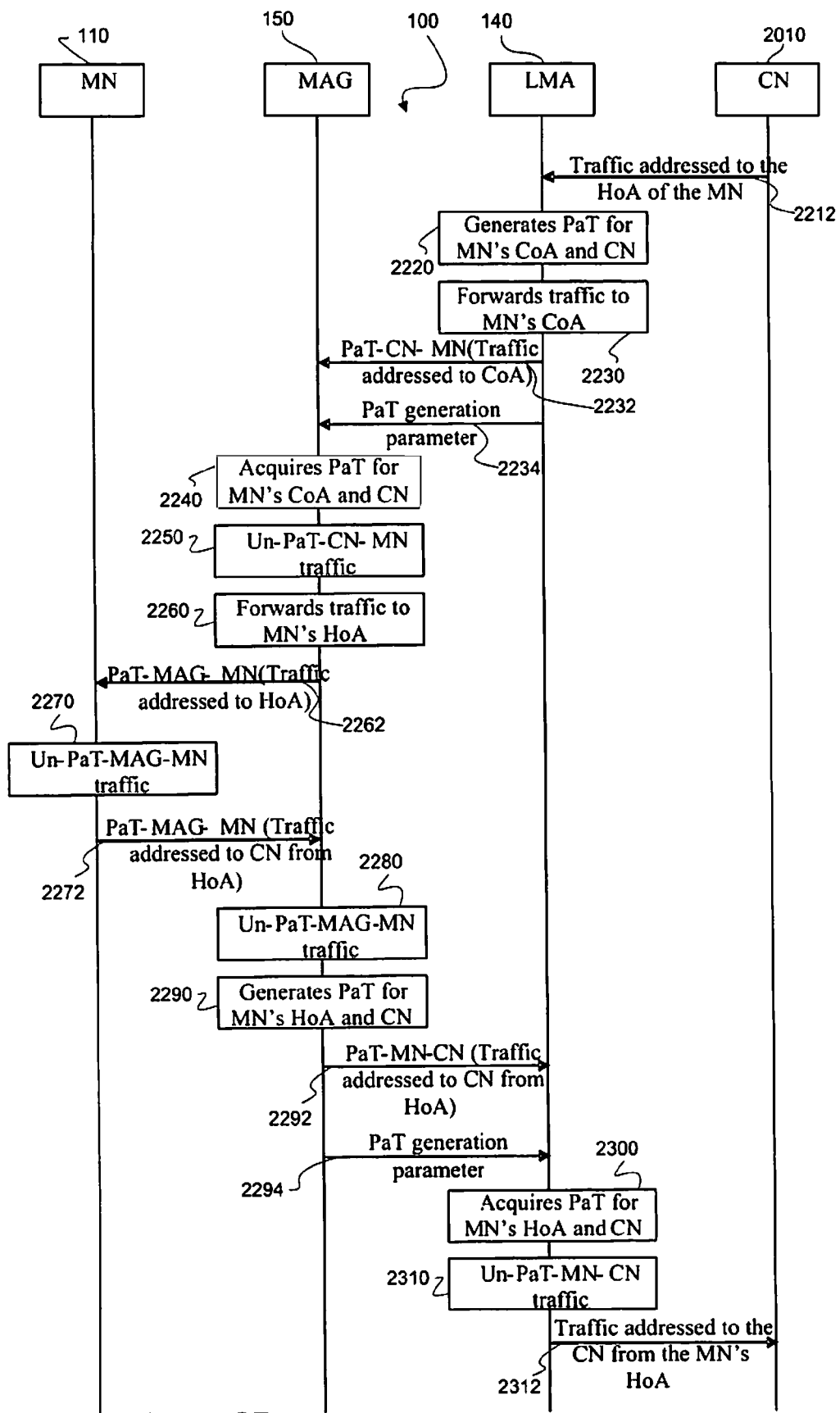

FIG. 2A and FIG. 2B together referred to as FIG. 2 show an exemplary signal flow and nodal operation chart of the protection scheme in accordance with the teachings of the present invention.

FIG. 2 starts with the MN 110 powering up or otherwise initializing in the home network 120. The MN 110 is shown authenticating 2100 with the AAA 160 (in a known manner outside the scope of the present invention). The AAA 160 then generates 2110A a secret called "privacy key" or "master key" (Kp)". Kp is further likely to be stored (not shown) in the AAA 160. While generating Kp can be performed when authenticating 2100A the MN 110 for the first time (as shown on FIG. 2), the step of generating Kp is likely to occur later on, for instance, when the MN 110 is already attached to the visited network 130 and authenticates therefrom. Kp may further be regenerated periodically. The exact logic in which Kp is generated falls outside the scope of the present invention. The MN 110 also generates Kp 2110B in the same way as the AAA 160 does. Kp is then used by the MN 110 and by the AAA 160 to generate at least one "transient handoff key (THK)" 2120A-B using Kp. THK could be generated by, for instance, first[128,hash(hash(Kp)|existing time stamp)], first [128,hash(hash(Kp)|pNAI)], first [128,hash(hash(Kp)|key generated from the AAA based on the MN's 110 authentication used in AKA protocol)], etc.). The use of the THK will be shown later on with regards to encryption of data between the MAG 150 and the MN 110. The important aspect is that the MN 110 and the MAG 150 both acquire the THK in a manner that is safe enough to ensure that THK is not likely to be compromised. The THK, in that regard, could also be shared from the AAA 160 to the LMA 140 (2114). Kp itself could technically be shared directly without generating the THK. However, this is not suggested as it compromises Kp, which could not be considered anymore as a master or privacy key for the MN 110.

A network address identifier (NAI) associated to the MN 110 is commonly used as one of the means of authentication between the AAA 160 and the MN 110. An example of NAI would be ietf@ericsson.com. In order to avoid using the NAI in subsequent authentication, the MN 110 and the AAA 160 may generate a pseudo-NAI (pNAI) (e.g., hash[hash(Kp) |previous THK]), which is then shared as needed with other nodes involved in the authentication of the MN 110 in the network 100 (not shown) such as the MAG 150 and the LMA 140. An example of pNAI based on ietf@ericsson.com could be xyyagfvuw@ericsson.com FIG. 2 then follows with the MN 110 having a valid home address (HoA) in the home network 120 (2140). The manner in which such a valid HoA is obtained is, however, irrelevant to the teachings of the present invention. Moreover, the MN 110 may acquire the HoA while being in the visited network 130. In any case, the MN 110 then needs to be located in the visited network 130 (2150). Once there, the MN 110 may need to send a router solicitation (RtSol) message (2152) to request connectivity in the visited network 130. Alternatively, the MAG 150 in the visited network 130 may initiate the next steps without such RtSol 2152 if it becomes aware of the presence of the MN 110 in the visited network 130 (direct detection or detected by another means, which is outside the scope of the present invention). In the best mode of the invention known to the inventors, the MN 110 may further generate a new HoA in the visited network 130. The LMA 140 needs to be aware of the new HoA to advertise it. One easy way of obtaining the new HoA is to use the HNP as the network prefix (needed as the new HoA is valid in the home network 120) and use a function of the THK and the HNP as the IID (e.g., First [64, hash (HNP|THK)]). Since all the information used to generate the new HoA is known to both the LMA 140 and the MN 110, they can derive the new HoA without having to communicate it therebetween. The new HoA will thereafter be used to reach the MN 110 via the LMA 140. The new HoA shall, however, never be used plainly in the visited network 130. The same logic could be used as well when the MN 110 generates its HoA while in the Home Network 120.

The MAG 150 then authenticates the MN 110 (2154) with the AAA 160 in a usual manner (outside the scope of the present invention). The pseudo-NAI could be used by the MAG 150 therefore without compromising the MN's 110 NAI. The AAA 160, in its usual reply 2156 to the authentication request 2154, may include the THK previously computed. There is a further possibility for the MAG 150 to receive the THK from the LMA 140 later on in the process as will be shown.

The MAG 150, for instance because of the authentication process with the AAA 160, knows that a binding of the MN's HoA to the MAG's address (CoA) needs to take place. The MAG 150 therefore requests binding of the HoA of the MN 110 to its own address (care-of address CoA) by sending a proxy binding update (PBU) 2192 to the LMA 140 thereby enabling traffic addressed to the HoA to reach the MAG 150. The PBU 2192 shall include the pNAI that will enable the LMA 140 to identify the MN 110. The LMA 140 may reply thereto with a binding acknowledgment (or proxy binding acknowledgment—PBA) 2194. Optionally, the PBA 2194 may further comprise the THK as discussed earlier. In the best mode known to the inventors, the PBA 2194 shall provide the Home Network Prefix (HNP) of the MN's 110 HoA to the MAG 150 as required by PMIPv6.

Thereafter (e.g., once the MN 110 is authenticated), the MAG 150 generates a first protection parameter for the MN 110 (2160). The first protection parameter. The first protection parameter can then be used to generate, at least partially, a pseudo-IPv6 address (pIPv6) for the MN 110 (2170). The pIPv6 of the MN 110 can be generated by using the first protection parameter to replace the HNP as the network prefix. For instance, the first protection parameter that becomes the network prefix of the pIPv6 could be the first 64 bits of the result of the hash the HNP with the hash of the THK (i.e. hash (HNP|hash (THK)). Alternatively, the MAG 150 could also generate the IID of the pIPv6 for the MN 10 based on the first parameter or a second parameter in a manner that would be known to the MN 110. Yet another alternative is to use the First [64, hash (HNP|THK)] that is used to generate the new HoA to also generate the pIPv6's IID. The fact that the pIPv6 and the new HoA share a common IID does not threaten the new HoA as a different network prefix is used.

The MAG 150 may then proceed to test the pIPv6 in the visited network (2180) on behalf of the MN 110. If the MAG 150 avoided generation of the IID of the pIPv6, then it tests the pIPv6's network prefix only using a modified Duplicate Address Detection (DAD) and relies on uniqueness of the IID generated by the MN 110 (e.g., as required by standard such as PMIPv6). Otherwise, the test is achieved by the MAG 150 via a usual DAD procedure usually executed by the node owning the address. If the DAD is negative (duplication detected), then the MAG 150 regenerates the first protection parameter and a new pIPv6 (or portion thereof) (2180).

The next step of generating a Pad Translator for the link between the MN 110 and the MAG 150 (PaT-MAG-MN) 2190 can be executed as soon as if the DAD procedure is positive (no duplication) or simply not executed. The PaT-MAG-MN generation could also be performed at a later stage whenever traffic needs to be exchanged with the MN 110. The generation of the PaT-MAG-MN can be achieved by applying an exclusive-or (XOR or XORing) on the MN's 110 HoA and the pIPv6 address. In the best mode known to the inventors, the PaT-MAG-MN is generated in the MAG 150 by applying an exclusive-or on the MN's 110 HoA HNP and the network prefix of the pIPv6 (a.k.a. the first protection parameter) The purpose of the pIPv6 and the PaT-MAG-MN is to prevent using the HoA of the MN 110 on the link between the MN 110 and the MAG 150 in a simple, efficient yet secured manner.

The MAG 150 then sends a router advertisement (RtAdv) (2196) to the MN 110 that comprises, the HNP encrypted with the THK (seen as a real network prefix by eventual sniffers) and, optionally, the first protection parameter (that is the pIPv6's network prefix). It would also be possible for the MAG 150 to send the first protection parameter to the MN 110 in a new or other existing message. However, the best mode known to the inventors is to send the first protection parameter in the RtAdv 2194 in a new option thereof.

It should be noted that the THK should be updated, in the best mode known to the inventors, each time the MN 110 authenticates with the AAA 160. The MAG 150 needs to be made aware of the new THK every time it changes. In addition to refreshing THK, the AAA 160 and the MN 110 should also regenerate the pNAI and bind it to the new THK to be used. The new pNAI is used by the MN 110 during the next authentication with the AAA 160 and is carried by the PBU message sent by the MAG 150 to the LMA 140. The MAG 150 received the pNAI from the AAA 160 after authentication of the MN 110 therewith. The pNAI is sent to the LMA 140 prior to receiving a PBU message (e.g., after a successful authentication) thereby enabling proper tracking of the MN 110 in the LMA 140.

Upon reception of RtAdv 2194, the MN 110 can generate the pIPv6 2200. It needs to be the same as the one generated by the MAG 150. As such, the same logic used in 2170 needs to be applied here. In the best mode known to the inventors, the network prefix of pIPv6 is generated by taking the first 64 bits of the result of the hash the HNP with the hash of the THK (i.e. hash(HNP|hash(THK)), which is the first protection parameter. The pIPv6's IID can be a randomly 64 bits identifier that the MN 110 needs to test for uniqueness (as provided by PMIPv6). However, in the best mode and as described earlier, the pIPv6's IID should be use the First [64, hash (HNP|THK)]. The MN 110 then generates the PaT-MAG-MN 2210. Again, the PaT-MAG-MN needs to be generated using the same logic as the one generated in the MAG 150. As such, the logic here in 2210 is the same as the one used in 2190. Alternatively, in some implementations, the PaT-MAG-MN could also be generated by only one of the MAG 150 and the MN 110 and sent securely (e.g., encrypted using THK or other means) to the other node. Furthermore, the PaT-MAG-MN could also be generated in both nodes and its value used therebetween as a means of authentication.

FIG. 2 then follows with reception at the LMA 140 of traffic addressed to the HoA 2212 by a Correspondent Node (CN) 2010. The LMA 140 may want to avoid using the HoA on the link towards the MAG 150 (if the threat is seen as sufficient to justify such a measure or, for other reasons, if tunneling optimization (TO) is used). The LMA 140 generates a PaT for the MN 110 (see <other invention reference inserted here> (PaT-CN-MN) 2220. The PaT-CN-MN, minimally, removes the HoA from the link towards the MAG 150 (if this was seen at all as a need). This can be achieved, for instance, by generating the PaT by, in the best mode known to the inventors, applying an exclusive-or using the CN's 2010 address and LMA's 140 address and the MN's 110 HoA and the MAG's 150 CoA). The PaT-CN-MN is then applied to the traffic received from the CN 2010 before being forwarded to the MAG 150 (2230 into 2232).

The MAG 150 then needs to acquire the PaT-CN-MN 2240. This can be done, for instance, using the same logic as in the LMA 140 at 2220. It needs, for this purpose, the CN's 2010 address. While it is likely that such information will be obtained from the traffic flow itself (e.g., inserted in the destination option or in the flow label option), for clarity purposes, a message 2234 is shown sending, from the LMA 140 to the MAG 150, a PaT generation parameter, which, in the present example, is the CN's 2010 address. Alternatively, the PaT generation parameter could simply be an encrypted (or otherwise secured) copy of the PaT-CN-MN as generated by the LMA 140. The original traffic from the CN 2010 is then retrieved in the MAG 150 by applying the PaT-CN-MN thereto (2250) before being forwarded to the MN 110 using the PaT-MAG-MN (2260 into 2262). The steps 2250 and 2262 could be performed in a single operation. The result of 2260 is that traffic is addressed to the pIPv6 without further intervention.

The MN 110, upon reception of the traffic 2262 and if needed at all, retrieves the original traffic by applying the PaT-MAG-MN thereto 2270. This may turn out to be unnecessary as the payload of the traffic could be used directly be the MN 110 as well. However, the actual complete packets may be useful for upper layer applications or the traditional network stack and can be obtained therethrough.

When the MN 110 sends traffic addressed from the HoA to the CN 2010, it uses the PaT-MAG-MN thereon (2272). The MAG 150 applies the PaT-MAG-MN to retrieve the original traffic (2280). The MAG 150 then generates a PaT for protecting the HoA on the link towards the LMA 140 unless it was previously generated (see 2240) and only if the threat is seen as sufficient to justify such a measure or, for other reasons, if tunneling optimization (TO) is used. The MAG 150 generates such PaT for the MN's 110 HoA and the CN 2010 (PaT-MN-CN) 2290. The MAG 150 then forwards the traffic 2292 using the PaT-CN-MN (generated in 2290 or from 2240). The LMA 140 then uses the PaT generated in 2220 or otherwise acquires the PaT-CN-MN 2300 using the same logic as the MAG 150 in 2290 or a PaT generation parameter sent thereto from the MAG 150 (2294). The original traffic is then retrieved 2310 before being forwarded to the CN 2010 just as if none of the steps related to this invention had taken place.

In cases of MN initiated traffic or when the session already exists, the principle of PaT generation is the same, but the order of PaT generation may be different.

Figure 3:
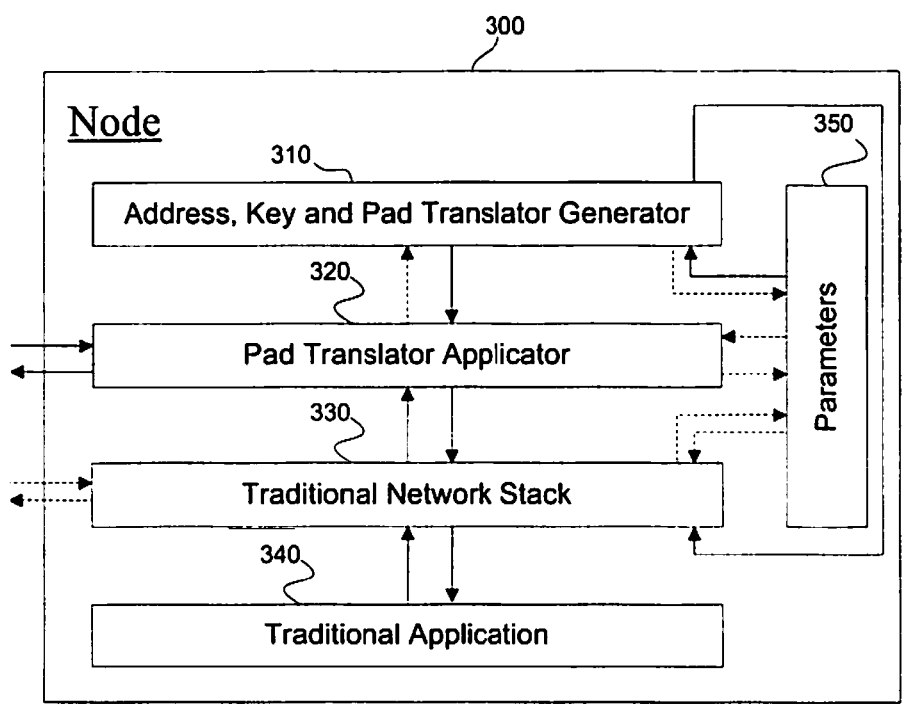
FIG. 3 is an exemplary Node 300 in a visited network of a telecommunications network in accordance with the teachings of the present invention.

FIG. 3 shows an exemplary Node 300 in a visited network of a telecommunications network in accordance with the teachings of the present invention. The Node could, for instance, be a mobile node (as, for example, the MN 110) or a network node (as, for example, the MAG 150). A mobile node (i.e. the node 300 itself or a further mobile node) has a home address (HoA) valid in a mobile node's home network of the telecommunications network. The HoA is used by the mobile node in the visited network. The Node 300 comprises an Address, Key and Pad Translator Generator (or Pad Translator generator module) 310, a Pad Translator Applicator 320, a Traditional Network Stack 330 and a Traditional Application 340. Parameters 350 are also maintained in the node 300. The Pad Translator Generator module 310 that generates a Pad Translator (PaT) from at least one protection parameter from the parameters 350 by applying at least one exclusive-or (XOR) thereon. The Pad Translator Applicator module applies the PaT on at least a portion of a header of a packet using an exclusive-or (XOR) function thereby enabling protection of at least a portion of the HoA in the visited network. The Pad Translator Applicator module 320 of the node 300 may further apply the PaT the packet before sending the packet in the visited network thereby enabling protection of at least the portion of the HoA in the visited network by avoiding disclosure of at least the portion of the HoA in the visited network. For example, the packet itself is likely to come from the traditional network stack 330, which may have been sent from the traditional application 340. The traditional network stack may also further communicate directly with other nodes. However, all communication involving the HoA in the visited network as expected to first go through the Pat Applicator module 320.

The Node 300, acting as a mobile node, may generate a first of the at least one protection parameter after reception of a home network prefix from a Mobile Anchor Gateway (MAG) of the visited network. Alternatively, the first of the at least one protection parameter may be received by the node 300 from the MAG of the visited network. The Pad Translator Generator module 310 may then generate the PaT by applying an exclusive-or (XOR) on the first protection parameter and at least a portion of the HoA.

The Pad Translator Applicator module 320 may further apply the PaT on at least the portion of the header of the packet after receiving the packet from the MAG thereby enabling protection of at least the portion of the HoA in the visited network by avoiding disclosure by the MAG of at least the portion of the HoA in the visited network.

The Pad Translator Generator module 310 further generates a pseudo-IPv6 address for the mobile node based on the first protection parameter. The Node 300, acting as a network node, may further test the pseudo-IPv6 address for duplication of address in the visited network. If the pseudo-IPv6 address is tested to be duplicated, the Pad Translator Generator module 310 may regenerate the first protection parameter and generates a second pseudo-IPv6 address for the mobile node based on the regenerated first protection parameter before sending the regenerated first protection parameter to the mobile node.

The Node 300, acting as a mobile node, may further generate a second of the at least one protection parameter upon authentication with an Authentication, Authorization, Accounting node (AAA). The Pad Translator Generator further receives the home network prefix in an encrypted format and uses a key generated from the second protection parameter to obtain the home network prefix.

The Node 300, acting as a network node, shall apply the PaT on at least the portion of the header of the packet before sending the packet in the visited network thereby enabling protection of at least the portion of the HoA in the visited network by avoiding disclosure of at least the portion of the HoA in the visited network. The HoA is used by the mobile node in the visited network for receiving packets via the network node from a Correspondent node (CN) having a CN address. The at least one protection parameter, in such a case, then comprises the HoA and the CN address and the Pad Translator Generator module 310 generates the PaT by applying an exclusive-or (XOR) on at least the portion of the HoA and at least a portion of the CN address.

The Pad Translator Generator module 310 in the node 300 acting as a network node may generate a first of the at least one protection parameter and may further send it to the mobile node. The Node 300 may also further receive a second of the at least one protection parameter upon authentication of the mobile node with the AAA. The Pad Translator Generator module 310 may then further send to the mobile node, in a Router Advertisement message, a Home Network Prefix encrypted using the second protection parameter.

The Pad Translator Applicator module 320 may apply the PaT on at least the portion of the header of the packet after receiving the packet from the mobile node thereby enabling protection of at least the portion of the HoA in the visited network by avoiding disclosure by the mobile node of at least the portion of the HoA in the visited network.

Figure 4A:
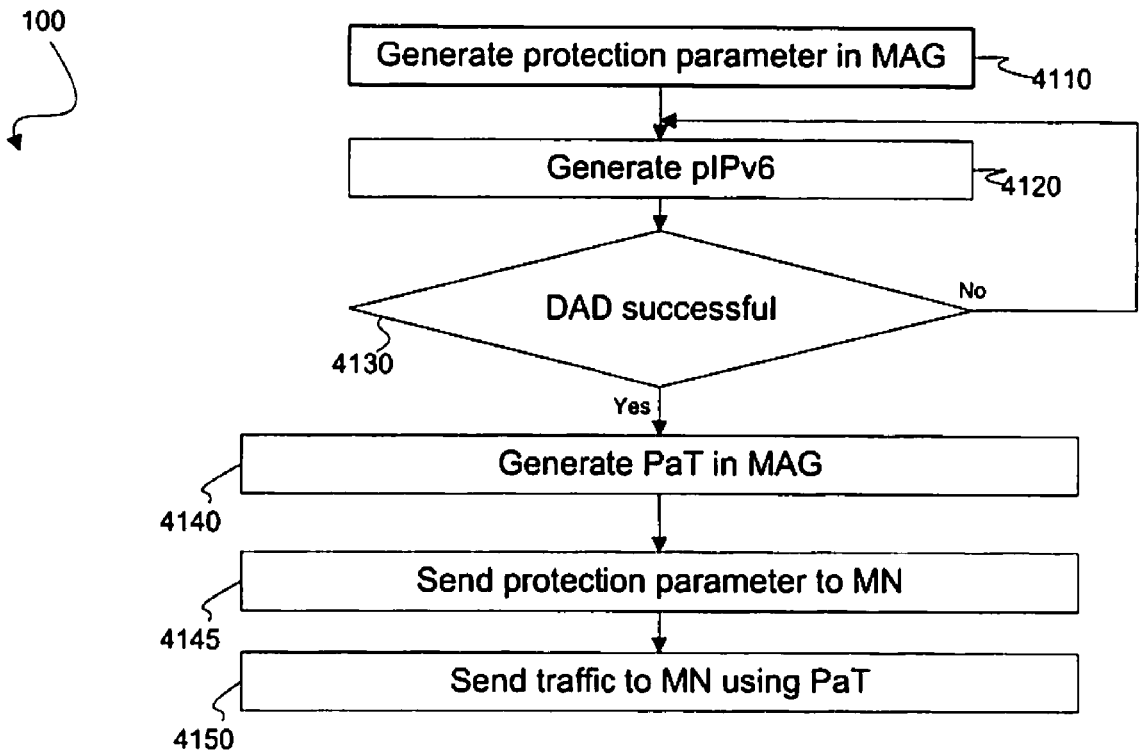
FIG. 4 is an exemplary flow chart of a method for enhancing protection of a Mobile Node's (MN) Home Address (HoA) in a visited network of a telecommunications network in accordance with the teachings of the present invention.
Figure 4B:
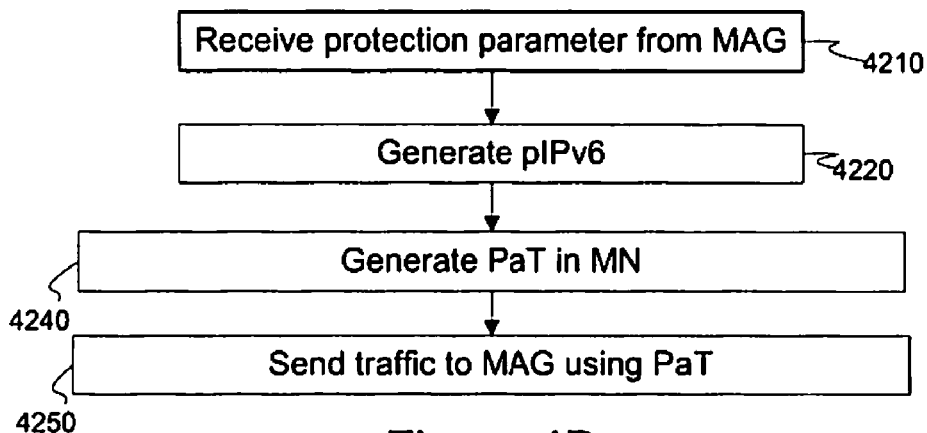

FIG. 4 shows a method for enhancing protection of a Mobile Node's (MN) Home Address (HoA) in a visited network of a telecommunications network in accordance with the teachings of the present invention. The MN as a valid HoA in a MN's home network of the telecommunications network or knows how to generate one from the visited network and uses the HoA in the visited network. The method comprises the steps of generating a Pad Translator (PaT) from at least one protection parameter by applying at least one exclusive-or (XOR) thereon 4140 and applying the PaT on at least a portion of a header of a packet using an exclusive-or (XOR) function thereby enabling protection of at least a portion of the HoA in the visited network 4150. The step of generating the PaT 4140 may be performed by applying an exclusive-or (XOR) on the protection parameter and at least a portion of a HoA. The step of applying the PaT 4150 on at least the portion of the header of the packet may be performed before sending the packet in the visited network thereby enabling protection of at least the portion of the HoA in the visited network by avoiding disclosure of at least the portion of the HoA in the visited network. Likewise, the MN may receive a packet in the visited network addressed to the HoA of the MN via a Mobile Anchor Gateway (MAG) from a Correspondent node (CN) having a CN address. The at least one protection parameter then comprises the HoA and the CN address and the Pad Translator Generator module generates the PaT by applying an exclusive-or (XOR) on at least the portion of the HoA and at least a portion of the CN address.

The method may further comprise generating a first of the at least one protection parameter 4110 in a Mobile Anchor Gateway (MAG) and sending the first protection parameter from the MAG to the MN. Likewise, the step of generating the first of the at least one protection parameter 4110 could be performed in the MN after reception of a home network prefix from the Mobile Anchor Gateway.

The method may further comprise receiving a second of the at least one protection parameter issued from an Authentication, Authorization, Accounting node (AAA) 4110 following authentication of the MN therewith. The MN may further receive from the MAG, the home network prefix in an encrypted format using a key generated from the second of the at least one protection parameter.

The method may also further comprise receiving a key issued from an Authentication, Authorization, Accounting node (AAA) upon authentication of the MN therewith 4110 and sending, from the MAG to the MN, a home network prefix in an encrypted format using the key.

The step of applying the PaT 4150 on at least the portion of the header of the packet may be performed in the MAG after reception of the packet from the MN thereby enabling protection of at least the portion of the HoA in the visited network by avoiding disclosure by the MN of at least the portion of the HoA in the visited network.

The method may also comprise a step of generating in the MAG or in the MN a pseudo-IPv6 address for the MN based on the first protection parameter 4120.

The method may then also comprise, from the MAG, testing the pseudo-IPv6 address for duplication of address in the visited network and, if the pseudo-IPv6 address is tested to be duplicated 4130, regenerating the first protection parameter and generating a second pseudo-IPv6 address for the MN based on the regenerated first protection parameter. The step of sending the first protection parameter from the MAG to the MN then comprises sending the regenerated first protection parameter from the MAG to the MN.

Another aspect of the present invention concerns nodes with multiple interfaces. Such nodes can potentially connect to the IP network using more than one access technologies (e.g., Wireless Local Area Network (WLAN), Third Generation Cellular (3G), Long Term Evolution (4G technology) (LTE), etc.). A node could transfer an ongoing session or communication (handoff) from a first interface that uses a first access technology to another interface using a different access technology (also referred to as vertical handoff). When PMIP is used for such handoff, the node may possibly obtain the exact same IP address on both network interfaces. The node's network management application cannot cope with the situation and the node loses IP connectivity until the IP address is removed from the now inactive network interface.

MIPv6 could be used as a handoff between access technologies, but the nodes can then no longer remain mobility-unaware and must take an active role in the necessary signaling that ensures it can be reached (i.e. discards the possibility of using PMIP).

The main current issue with vertical handoffs in the context of PMIP is that the same prefix is currently advertised over two different links. The present invention replaces the advertisement of the usual prefix in the new link with a new prefix that can be derived from the usual prefix using a known algorithm (for instance, an algorithm that is predictably determined such as a hashing function). The invention allows the nodes to remain mobility unaware (the network performs the mobility signaling). It also provides privacy with no additional cost since the true address of the node is not revealed over the new link.

The solution can advantageously be transparent to the application using a virtual interface, accessed by the application, which takes care of the interface selection. The IETF RFC 3484 otherwise provide other manner of performing the determination.

Figure 5:
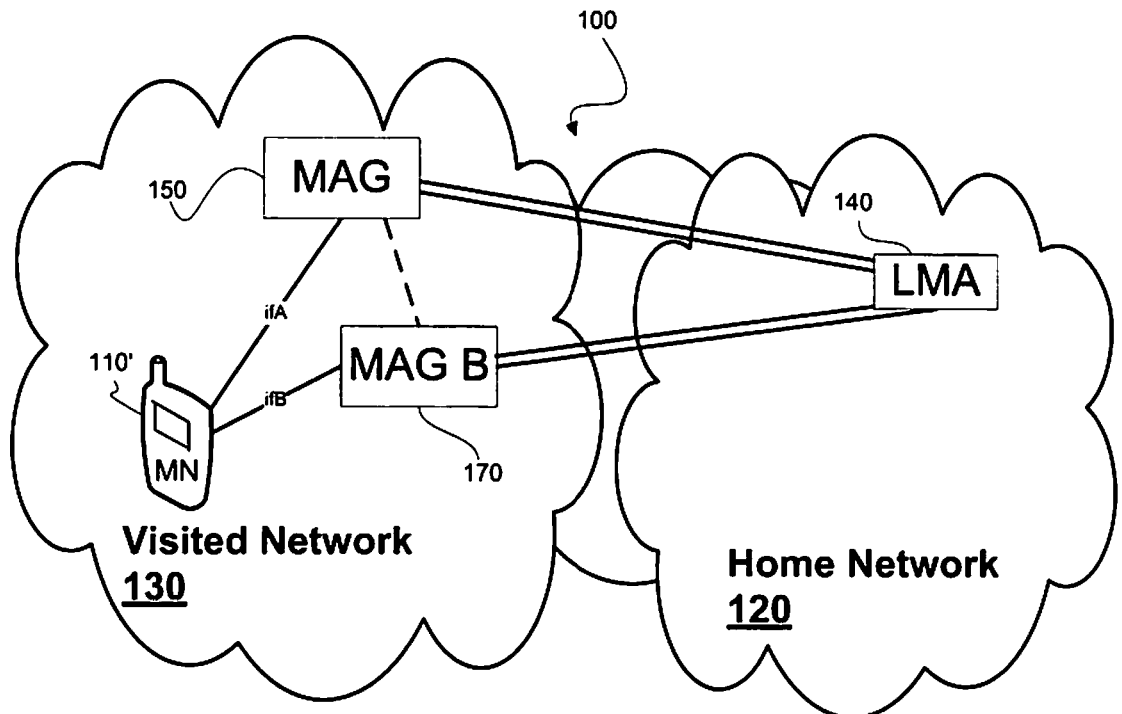
FIG. 5 is a topological view of a telecommunications network showing more than one mobility access gateway in accordance with the teachings of the present invention.

FIG. 5 is a topological view of a telecommunications network showing more than one mobility access gateway (MAG) in accordance with the teachings of the present invention. In comparison to FIG. 1, the MN 110 is replaced with a MN 110', which has at least one added network interface shown connecting through ifB on FIG. 5 towards a MAG B 170. A notation of ifA is added towards the MAG 150. The MAG B 170 connects to the LMA 140 in a manner that is similar to the MAG 150 and, generally, in accordance with the PMIP specification. Depending on the technologies, the MAG B 170, just as MAG 150, can represent different nodes. It is referred to as an access router (AR) in MIPv6 or, generally, in IPv6, as a serving gateway in LTE, as a Packet Data Serving Node (PDSN) in CDMA standards, as an edge node or Broadband Remote Access Server (BRAS) in fixed networks, etc. Similarly, the MN 110' likely represents a handled device, but shall be more generically construed as a node that is capable of mobility, even though the mobility is not necessarily a core feature of the device. It should be noted that the previously described manner of connecting MN 110 to MAG 150 does not necessarily applies to the connection between the MAG 150 and the MN 110'. That is, the MN 110' could connect using the PMIP standard procedure to the MAG 150 and still take advantage of the present aspect concerning vertical handoff of the invention.

Figure 6:
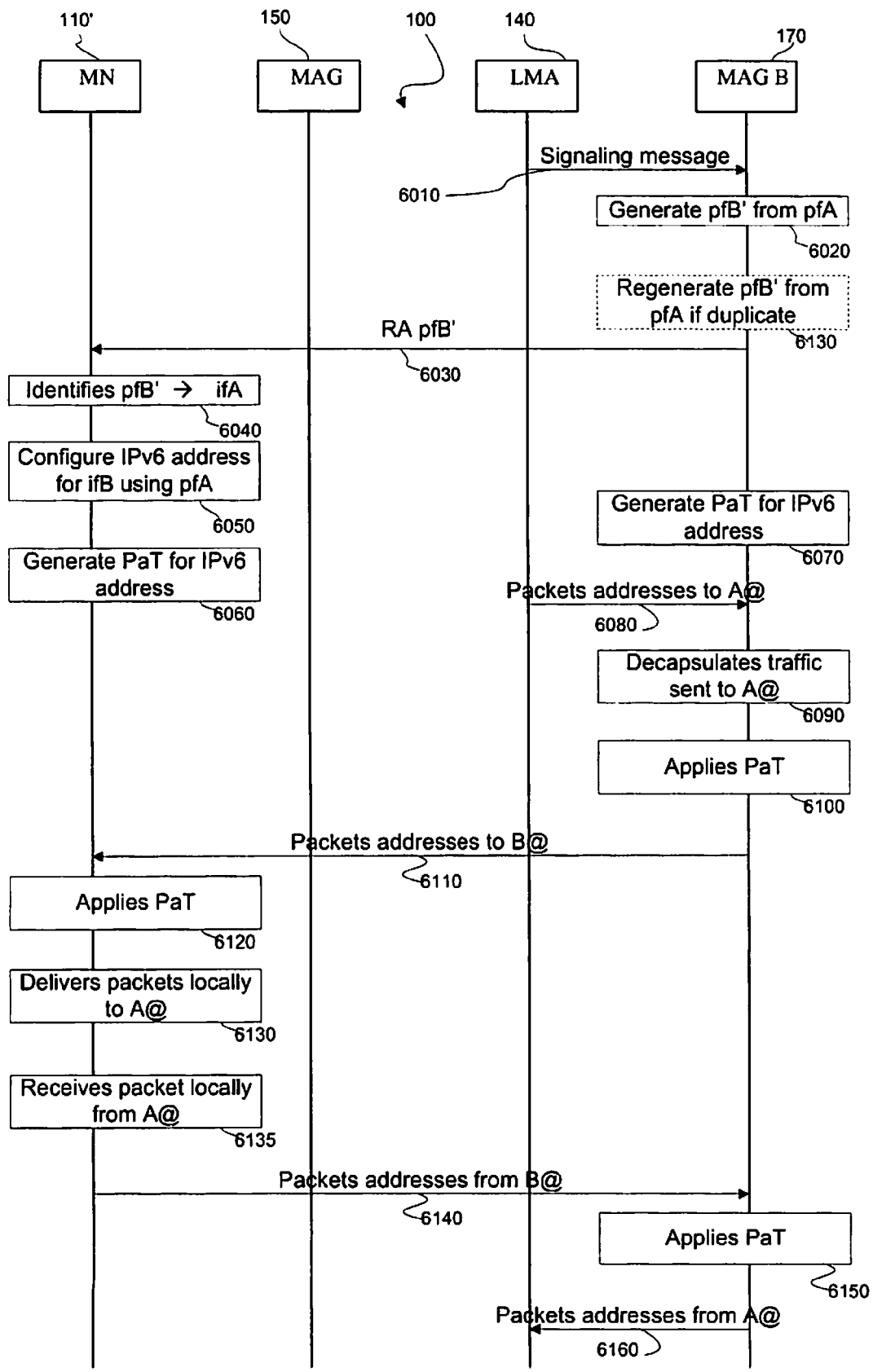
FIG. 6 is an exemplary signal flow and nodal operation chart of the vertical handoff scheme in accordance with the teachings of the present invention.

FIG. 6 is an exemplary signal flow and nodal operation chart of the vertical handoff scheme in accordance with the teachings of the present invention. Upon deciding on triggering an IP vertical handoff from ifA having an address A@ to ifB for the MN 110', the LMA 140 sends a signaling message 6010 to MAG B 170 in which it requests advertising a special Router Advertisement (RA) message. The prefix to be carried in the new RA message should be derived from the old prefix pfA currently used by the MN 110' over ifA using a determined algorithm. For instance, the MAG 170 could generate the pfB' (6020) using a hash algorithm or some kind of cryptographic function. i.e., pfB'=hash(pfA). The MAG B 170 then sends out a RA 6030 towards the MN 110' and sets a new bit therein (e.g., could be called the conditional stateless or CS bit). The CS bit provides for a trigger in at least some of the receiving nodes (which include the MN 110'). Based on the RA 6030 in which the CS bit is set, the MN 110' identifies the real interface which corresponds to pfB' 6040. This is done using the same know algorithm (e.g., hash function). In this case, the ifA is identified. The MN 110' then configures an IPv6 address for ifB (e.g., B@)) 6050 from XORing the same interface identifier(s) used on ifA for pfA. The MN 110' then generates a pad translator (PaT) 6060 that allows translating between A@ and B@. As the MAG B 170 knows B@ and A@, the MAG B 170 also generates the same PaT(s) 6070 as the MN 110' thereby enabling proper reachability of the MN 110'. A person skilled in the art will readily recognize that some of the steps performed by the MAG 170 and the MN 110' can be done in a different order without affecting the teachings of the invention.

At some point, the LMA 140 starts tunneling data packets sent to A@ to MAG B 170 (6080). Upon receiving such data packets, MAG B 170 decapsulates the packets addressed to A@ 6090. The MAG B 170 then applies the PaT and translates it to the address configured on ifB (B@)) 6100. The MAG B 170 then forwards the data packets to ifB using the destination address B@ 6110. Upon receiving data packets with destination address B@, the MN 110' applies the PaT to re-obtain A@ 6120. The packets can then be treated as ordinary packets, e.g., being directed to the appropriate socket (6130).

It is very unlikely that a duplicate address B@ could be obtained using the present scheme. However, as the MAG B 170 can check first pfb's uniqueness, it can simply reapply the known algorithm (e.g. hash it further) before advertising it to MN 110' if the check for uniqueness indicates duplication (shown by optional step 6130).

The MN 110' may also send packets locally addressed to A@ towards the MAG 170 by applying the same PaT (thereby translating A@ into B@) (6135). When receiving packets addressed from B@ (6140), the MAG 170 applies the PaT (6150) and forwards packets towards the LMA 140 (6160) as if they had been received from A@.

Figure 7:
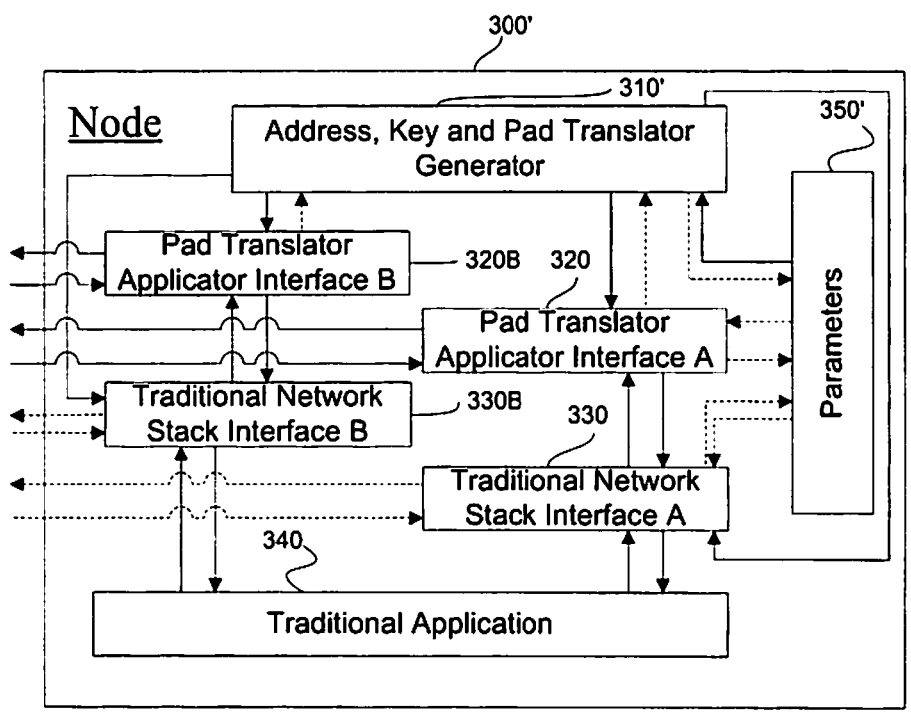
FIG. 7 is an exemplary Mobile Node 300' in a visited network of a telecommunications network in accordance with the teachings of the present invention.

FIG. 7 is an exemplary Mobile Node 300' in a visited network of a telecommunications network in accordance with the teachings of the present invention. In comparison to the Node 300 of FIG. 3, the Mobile Node 300' has a second traditional network stack (interface B) 320B and a second Pad Translator Applicator (Interface B) 330B. The Address, Key and Pad Translator Generator module is modified (310') and the Parameters are also modified (350') to accommodate the new aspects related to the present exemplary embodiment. The Parameters 350' may now include A@, B@, pfA, identifier of the function to be applied on pfA to obtain pfB', etc. The Address, Key and Pad Translator Generator module now generates the IPv6 address (B@) and the related PaT using, for instance, the pfA.

Figure 8A:
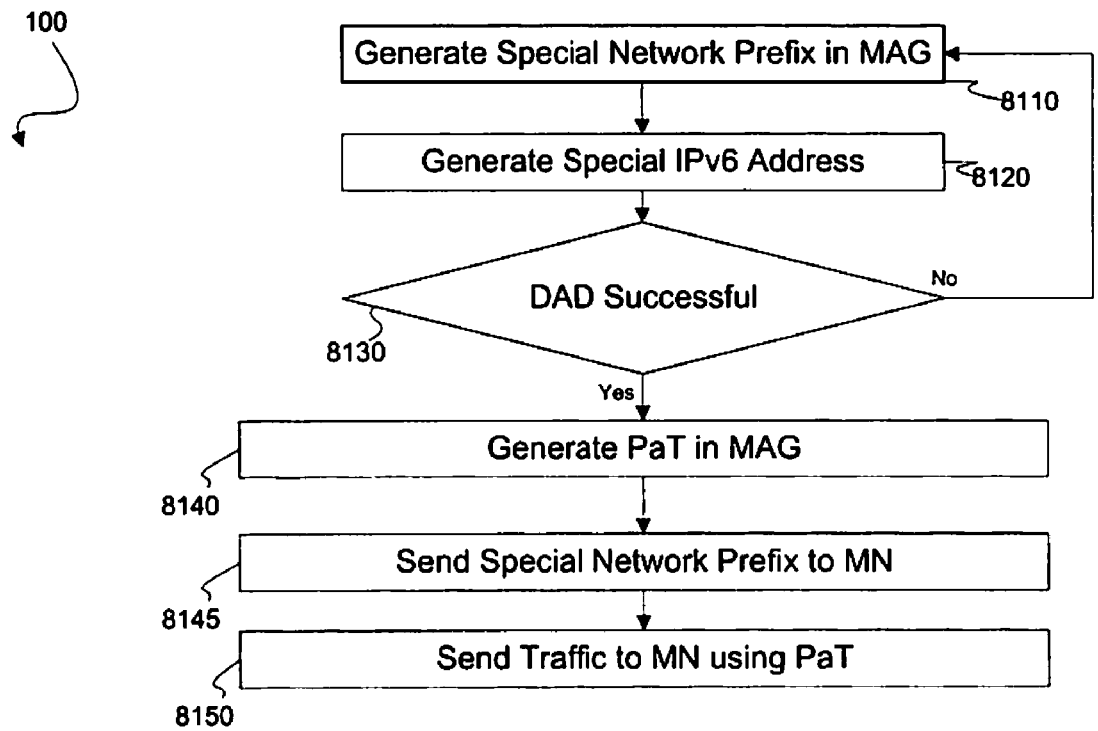
FIG. 8 is an exemplary flow chart of a method for enabling vertical handoff of a Node in a visited network of a telecommunications network in accordance with the teachings of the present invention.
Figure 8B:
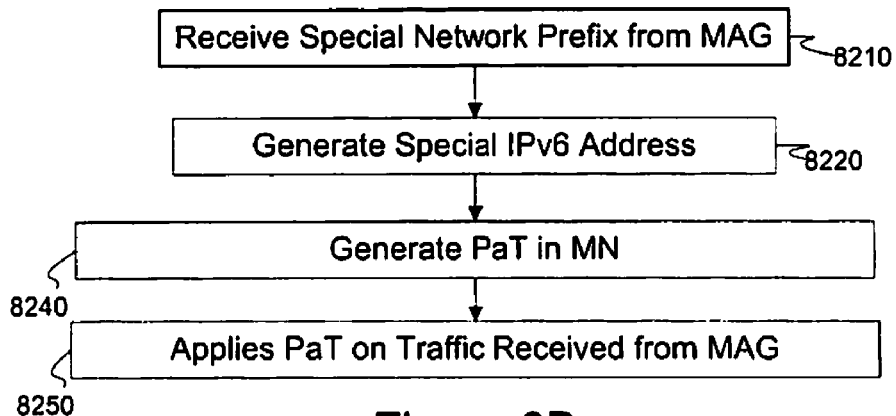

FIG. 8 is an exemplary flow chart of a method for enabling vertical handoff of a Node in a visited network of a telecommunications network in accordance with the teachings of the present invention. From the perspective of the MAG B 170, the main steps of the present invention include generating a special network prefix (e.g., pfB') (8110) in relation to the prefix pfA used for generating A@. The MAG B 170 can then generate a special IPv6 address (B@) for the MN 110' (8120) and, optionally, perform a Duplication Address Detection (DAD) procedure thereon (8130). If the procedure is not successful, the steps 8120 and 8130 can be repeated until the DAD is successful. The DAD is optional as it could be decided that the low probability of duplication does not justify the delay and trouble of the DAD procedure. If the procedure is successful (no duplication) or if DAD is skipped, then the method follows with the two steps of (in parallel or in ay order) generating a PaT in MAG B 170 (8140) for B@ and sending the special network prefix pfB' to MN 110' (8145). Traffic received at the MAG B 170 addressed to A is then forwarded to the MN 110' using the generated PaT (8150) thereby addressing the traffic to B@.

From the perspective of the MN 110', the present invention involves receiving the special network prefix pfB' from MAG B 170 (8210), generate the special IPv6 Address (B@) (8220) and generating the PaT corresponding to B@ in MN 110' (8230). The MN 110' then applies the generated PaT on traffic received from the MAG B 170 (8240) and, in the most common implementation of bidirectional communication, the MN 110' also applies the PaT on outgoing traffic sent to the MAG B 170 thereby replacing the A@ in the local packets for the B@ in the outgoing packets. Throughout the following claims, applying a PaT on data packets is equivalent to applying the PaT on at least a portion the data packets' header.

What is claimed is:

1. A method for permitting vertical handoff of a Mobile Node (MN) between a first interface of the MN bearing an address A@ to which a prefix pfA is associated and a second interface of the MN used to connect towards a Mobility Access Gateway (MAG), the method comprising the steps of:
   in the MAG, generating a network prefix pfB', which is derived from the prefix pfA as a function of pfA, with pfA being currently used by the MN over the first interface, and the pfB' being usable to generate an address B@ for the MN;
   generating a Pad translator (PaT) used to change between the address B@ and the address A@; and
   sending from the MAG the pfB' towards the MN over the MN's second interface.

2. The method of claim 1 further comprising the step of, after generating the network prefix pfB', generating the address B@ at the MAG.

3. The method of claim 2, further comprising performing a Duplication Address Detection (DAD) procedure on at least a portion of the address B@.

4. The method of claim 3 further comprising the steps of, if the procedure is not successful, regenerating the network prefix pfB'.

5. The method of claim 3 further comprising the steps of, if the procedure is not successful, regenerating the address B@ at the MAG.

6. The method of claim 1 further comprising
   receiving at the MAG data packets addressed to the address A@; and
   forwarding the data packets to the MN toward the second interface by applying the generated PaT thereby addressing the data packets to the address B@.

7. A method for permitting vertical handoff of a Mobile Node (MN) between a first interface of the MN bearing an address A@ to which a prefix pfA is associated and a second interface of the MN bearing the address A@ and used to connect towards a Mobility Access Gateway (MAG), the method comprising the steps of:
   in the MN, receiving a network prefix pfB' from the MAG over the second interface, the prefix pfB' being derived from the prefix pfA as a function of pfA, with pfA being currently used by the MN over the first interface;
   generating an address B@ for the MN; and
   generating a Pad Translator (PaT) used to change between the address B@ and the address A@.

8. The method of claim 7 further comprising the steps of:
   receiving data packets from the MAG over the second interface; and
   applying the generated PaT on the data packets received from the MAG thereby replacing the address B@ in the received data packets for the address A@.

9. The method of claim 8 further comprising a step of delivering the received data packets in the MN to the address A@.

10. The method of claim 7 further comprising a step of applying the PaT in the MN on outgoing data packets sent to the MAG thereby replacing the address A@ for the B@ therein.

11. A Mobile Node (MN) having a first interface bearing an address A@ to which a prefix pfA is associated and a second interface bearing the address A@ and used to connect towards a Mobility Access Gateway (MAG), the MN comprising:
   a Pad Translator Generator module that:
      receives a network prefix pfB' from the MAG over the second interface, the prefix pfB' being derived from the prefix pfA as a function of pfA, with pfA being currently used by the MN over the first interface;
      generates an address B@; and
      generates a Pad Translator (PaT) used to change between the address B@ and the address A@; and
   a Pad Translator Applicator module that:
      applies the PaT on data packets.

12. The Mobile Node of claim 11 wherein the Pad Translator Applicator module applies the PaT on the data packets before sending the data packets to the MAG.

13. The Mobile Node of claim 11 wherein the Pad Translator Applicator module applies the PaT on the data packets after receiving the data packets from the MAG.

14. The Mobile Node of claim 13 wherein the Pad Translator Applicator module delivers the received data packets in the MN to the address A@.

15. A Mobile Access Gateway (MAG), wherein a Mobile Node (MN) has a first interface of bearing an address A@ to which a prefix pfA is associated and a second interface used by the MN to connect towards the MAG, the MAG comprising:
   a Pad Translator Generator module that:
      generates a network prefix in relation to the prefix pfA;
      generates a network prefix pfB' usable to generate an address B@ for the MN, the prefix pfB' being derived from the prefix pfA as a function of pfA, with pfA being currently used by the MN over the first interface;
      generates a Pad translator (PaT) used to change between the address B@ and the address A@;
      sends the network prefix pfB' towards the second interface of the MN; and
   a Pad Translator Applicator module that:
      applies the PaT on data packets.

16. The MAG of claim 15 wherein the Pad Translator Applicator module applies the PaT on the data packet before sending the data packets to the MN.

17. The MAG of claim 15 wherein the Pad Translator Applicator module applies the PaT on the data packet after receiving the data packet from the MN.

18. The MAG of claim 15 wherein the Pad Translator Generator module, after generating the network prefix pfB', further generates the address B@.

19. The MAG of claim 18 wherein the Pad Translator Generator module further performs a Duplication Address Detection (DAD) procedure on at least a portion of the address B@.

20. The MAG of claim 19 wherein the Pad Translator Generator module, if the procedure is not successful, further regenerates the network prefix pfB'.

21. The MAG of claim 19 wherein the Pad Translator Generator module, if the procedure is not successful, further regenerates the address B@.

22. The method of claim 1, wherein generating a network prefix pfB' which is derived from the pfA as a function of pfA comprises using a cryptographic function of pfA.

* * * * *

UNITED STATES PATENT AND TRADEMARK OFFICE
CERTIFICATE OF CORRECTION

| | | |
|---|---|---|
| PATENT NO. | : 8,199,717 B2 | Page 1 of 1 |
| APPLICATION NO. | : 12/201882 | |
| DATED | : June 12, 2012 | |
| INVENTOR(S) | : Krishnan et al. | |

It is certified that error appears in the above-identified patent and that said Letters Patent is hereby corrected as shown below:

In Column 3, Line 29, delete "ptB'," and insert -- pfB', --, therefor.

In Column 6, Line 37, delete "MN 10" and insert -- MN 110 --, therefor.

In Column 11, Line 56, delete "function." and insert -- function, --, therefor.

In Column 12, Line 20, delete "pfb's" and insert -- pfB's --, therefor.

In Column 13, Line 32, in Claim 6, delete "comprising" and insert -- comprising: --, therefor.

Signed and Sealed this
Eleventh Day of September, 2012

David J. Kappos
*Director of the United States Patent and Trademark Office*